United States Patent [19]

Howard

[11] Patent Number: 4,580,749
[45] Date of Patent: Apr. 8, 1986

[54] SUPPORT COLUMN UNIT
[75] Inventor: Timothy L. Howard, Ambler, Pa.
[73] Assignee: Gas Spring Company Div. of Fichtel & Sachs Industries, Inc., Colmar, Pa.
[21] Appl. No.: 544,594
[22] Filed: Oct. 24, 1983
[51] Int. Cl.[4] .................................... F16M 11/00
[52] U.S. Cl. ................................. 248/161; 248/631
[58] Field of Search .............. 248/631, 161, 404; 267/131, 64.26; 188/321.11; 403/377, 104; 308/244

[56] References Cited

U.S. PATENT DOCUMENTS

| 1,951,730 | 3/1934 | Johnson | 308/244 |
|---|---|---|---|
| 3,711,054 | 1/1973 | Bauer . | |
| 3,741,592 | 6/1973 | Muncy | 403/377 |
| 3,788,587 | 1/1974 | Stemmler . | |
| 3,794,309 | 2/1974 | Chrokey et al. | 267/64.26 X |
| 4,072,288 | 2/1978 | Wirges et al. | 248/404 |
| 4,139,175 | 2/1979 | Bauer | 248/404 |
| 4,183,689 | 1/1980 | Wirges et al. | 248/161 X |
| 4,245,826 | 1/1981 | Wirges . | |
| 4,329,800 | 5/1982 | Shuman | 403/104 X |
| 4,415,135 | 11/1983 | French | 248/161 |

Primary Examiner—Ramon S. Britts
Assistant Examiner—David M. Purol
Attorney, Agent, or Firm—Brumbaugh. Graves, Donohue & Raymond

[57] ABSTRACT

A resilient support column for height-adjustable chairs or the like includes a piston-and-cylinder type pneumatic spring that is installable in and removable from the column by means of a retaining sleeve structure carried by the spring. The retaining sleeve is connected to the column through a threaded connection that permits quick one-step insertion of the combined sleeve-spring unit into the column, while thereafter affording the advantage of threaded adjustment within the column or threaded removal therefrom. A simple mechanical fastener holds the retaining sleeve in place on the pneumatic spring during shipment and/or assembly.

17 Claims, 2 Drawing Figures

SUPPORT COLUMN UNIT

BACKGROUND OF THE INVENTION

1. Field of the Invention

The present invention relates in general to resilient support columns for height-adjustable chairs, tables and the like, of the type including a pneumatic spring as the operating component, and pertains in particular to a novel retention system for facilitating the installation and removal of pneumatic spring operators in such columns.

2. The Prior Art

In one type of known adjustable-height support column, the column includes two telescopically movable tubular members, one being attached to the surface to be supported, e.g. a chair seat, and the other being attached to the supporting structure for the surface, e.g. the base of a chair. A piston-and-cylinder type pneumatic spring, containing a gas or gas/oil mixture under high pressure, is inserted within the two tubular members, with the piston rod member being operatively connected in load-transmitting relation to one of the tubular members and the cylinder member being similarly connected to the other tubular member. The overall length of the pneumatic spring, and thus the height of the support column, may be adjusted by operation of a manually-operable valve mechanism internal to the spring.

In the assembly of such prior art support columns, the pneumatic spring is typically inserted axially into one of the tubular members, e.g. the upper member connected to the surface to be supported, and then retained therein by a spring clip, plugs, ball detents, etc., acting between the tubular member and the cylinder of the pneumatic spring. For example, such a prior art support column is described in U.S. Pat. No. 3,788,587, issued Jan. 29, 1974 to the assignee of the present application.

Although these prior art retention systems do to some extent facilitate assembly and disassembly of the pneumatic spring, they have not been altogether satisfactory in that they require special-purpose retention devices or structures, e.g. ball detents, retention grooves, and the like, in the cylinder member of the pneumatic spring itself. Also, the spring clips, plugs, etc. used to fasten the pneumatic spring to the column are external, non-attached parts that are subject to being lost and working loose during use. Moreover, these external devices necessitate a secondary installation step after the pneumatic spring has been inserted in the tubular column which is time consuming and ofttimes difficult to carry out properly. A further disadvantage of the prior art retention mechanisms is that they do not assure a firm engagement between the load-transmitting surfaces of the pneumatic spring and the tubular members of the column, nor do they provide the desired close fit between the valve-operating components of the pneumatic height-adjustment system. If too great a clearance is permitted among these respective bearing surfaces and components, it can interfere with the proper operation of the valve operator for the pneumatic spring and additionally could produce undesired chatter during use or adjustment of the chair.

SUMMARY OF THE INVENTION

The foregoing and other disadvantages of the prior art are overcome, in accordance with the present invention, by the provision of a novel retaining sleeve structure that fits over the pneumatic spring and forms therewith a combined sleeve-spring assembly that is installed as a single unit within the support column. Except for a simple spring clip or the like to tie the sleeve and spring together during assembly, all of the retention structure needed to lock the spring in place within the column is carried either by the sleeve or by the column. No special-purpose retention structure is required on the pneumatic spring itself, and the invention is therefore compatible with conventional, standard design spring units.

In a preferred embodiment, the retaining sleeve is sized to fit axially over and surround a portion of the pneumatic spring. It is formed with axially facing surfaces, preferably in the form of a radially-inwardly extending plate at the inner end of the sleeve, which engage, either directly or indirectly, respective bearing surfaces on the pneumatic spring and the column to transmit loads from the supported surface, e.g., a chair, to the underlying base. Suitably, the end plate has a central aperture which fits over the piston rod or a boss on the spring cylinder, depending on whether the spring is in the rod-up or rod-down orientation, with the radially inner portion of the plate bearing against a land on the piston rod (or boss) and the radially outer portion of the plate bearing against a land on the surrounding column member. If desired, load-bearing shims or spacers may be interposed between the respective lands on the spring member and the column member to permit adjustment of the clearance between the valve-operating components of the pneumatic system. A spring clip or other like simple fastener is preferably provided on the piston rod (or boss) outward of the end plate to hold the retaining sleeve on the pneumatic sleeve during shipment and installation within the column.

Retention of the sleeve within the column member is preferably by way of screw threads formed on one of the members and radially-projecting detents, which coact with the threads, formed on the other member. The detents are sufficiently resilient to permit them to be snapped over the threads in a ratchet-like manner, i.e., in an axial direction, without threading. This affords quick, one-step installation of the combined sleeve-pneumatic spring unit in the column. Once installed, however, the threaded connection permits any clearances that might exist or develop between the loadbearing surfaces of the sleeve and the column member to be readily and fully taken up simply by threading the sleeve farther into the column. Also, the threaded connection simplifies removal of the sleeve and pneumatic spring, which may be withdrawn as a unit, should repair or replacement become necessary.

To facilitate threading or unthreading of the retaining sleeve within the column member, the retaining sleeve is preferably made long enough to extend beyond the end of the column member within which it is received, where it may readily be gripped by hand or by tool. Further, in applications where a resilient stop is required, such as in chair columns (by DIN specification), the resilient stop member may conveniently be placed between the pneumatic spring and the end plate of the sleeve, thereby further facilitating assembly or disassembly of the column as a whole.

BRIEF DESCRIPTION OF THE DRAWINGS

For a better understanding of the invention, reference be made to the following detailed description of examplary embodiments thereof, taken in conjunction with the accompanying drawings, in which.

DETAILED DESCRIPTION

For convenience, the invention is described hereinbelow by reference to specific embodiments thereof as a height-adjustable support column for a chair. It will be understood, however, that the invention is not limited to chair support columns, but that it has utility as well in a wide variety of applications in which height-adjustable (or, more generally, length-adjustable) supports are needed or desirable.

Figure 1:
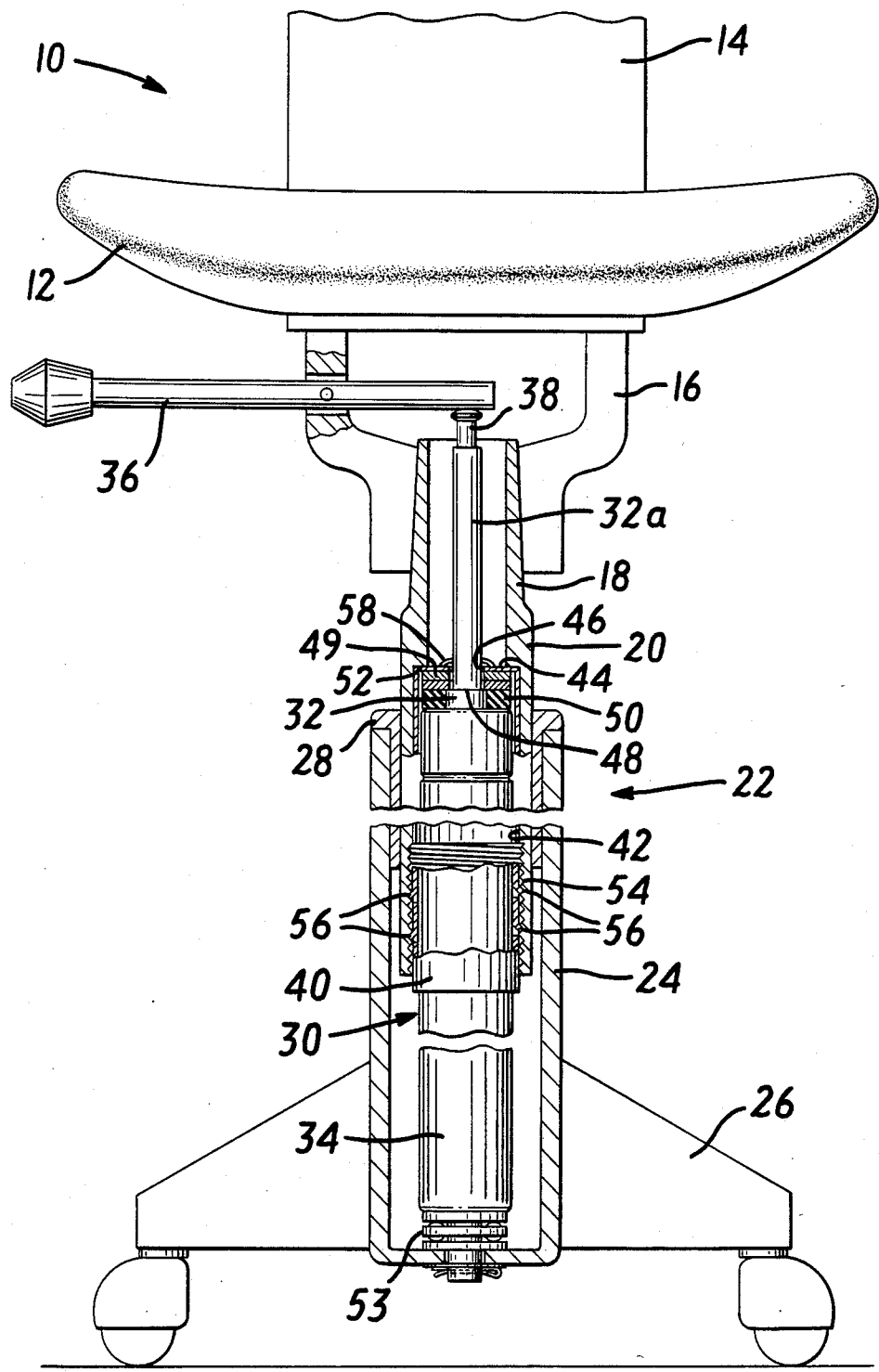
FIG. 1 is a sectional view, with parts broken away for clarity, of one embodiment of a support column embodying the present invention, with the pneumatic spring arranged in the rod-up position.

In the embodiment of FIG. 1, a chair 10 having a seat 12 and a back rest 14 is shown as supported in a conventional manner by a frame 16 on the upper tapered end 18 of a tubular support member 20 which forms a part of the support column 22 for the chair. The upper tubular member 20 is telescopically received in a lower tubular member 24, which is in turn integral with and a part of the base 26 of the chair. A low-friction, e.g. plastic, bushing 28 is fitted between the upper and lower tubes 20 and 24 to guide movement of the upper tube 20 within the lower tube 24 and also to act as a protective end cap for the upper end of the lower tube 24.

Located within the support column 22 and extending axially through the upper and lower tubular members 20 and 24 is a piston-and-cylinder type pneumatic spring 30. The spring 30 may be of essentially conventional construction, as shown, for example, in U.S. Pat. Nos. 3,447,645 and 4,245,826. As described in those patents, the relative axial position of the piston rod 32 within the cylinder 34 of the spring 30 may be adjusted by opening an internal valve (not shown) which governs gas flow across the piston within the cylinder. This is accomplished by manipulation of a hand lever 36 to depress a valve actuating rod or pin 38 to open the internal valve of the pneumatic spring 30. The force of the gas pressure acting on the cross sectional area of the piston rod urges the piston rod outward of the cylinder.

In accordance with the present invention, assembly or disassembly of the gas spring 30 within the support column 22 may readily be accomplished, and without the use of external fastening devices or special-purpose structure on the pneumatic spring itself. Thus, as shown in FIG. 1, the pneumatic spring 30 does not directly engage the upper tubular member 20 but is instead received within a retaining sleeve 40 that surrounds and extends over an axial portion thereof. The retaining sleeve 40 is itself sized to be received within an axial bore 42 in the tubular member 20.

At its upper end (the innermost end relative to the tubular member 20), the retaining sleeve 40 is formed with an end plate 44 that is provided with a central aperture 46 for passage therethrough of a reduced-diameter portion 32a of the piston rod 32. The lower surface of the radially inner portion of the plate 46 thus overlies the axially facing land 48 on the piston rod formed at the juncture of the fullsized portion and the reduced diameter portion 32a of the piston rod 32. If desired, the plate 46 may bear directly against the land 48. In accordance with the invention, however, shims or spacers 49 are preferably interposed between the plate 46 and the land 48. These spacers 49 permit adjustment of the relative axial positions of the load-transmitting lands 48 and 52, thereby permitting close control of the gap between the valve operating lever 36 and the valve pin 38. Such close control of the components of the pneumatic valveoperating system is very important. In applications where a resilient stop is required or desirable, e.g., in chair columns, an elastomeric member 50 may conveniently be provided between the upper end of the spring cylinder 34 and the spacers 49 for that purpose.

The upper surface of the end plate 44 bears, over the radially outer portion thereof, against an axially facing land 52 formed at the end of the axial bore 42 in the tubular member 20. Thus, as will be appreciated, the load from the chair is transmitted via the upper tubular member 20 and land 52 to the end plate 44 of the retaining sleeve 40, then through the land 48 and the spacers 49 to the piston rod 32, and thence via the spring 30 to the base 26. Hence, the end plate 44 of the retaining sleeve 40 operatively couples the upper tubular member 20 in load bearing relation to the pneumatic spring 30 and therethrough to the lower tubular member 24 and the base 26.

The spring cylinder 34 is illustrated in FIG. 1 as being conventionally connected at its lower end to the tube 24 through a thrust-bearing assembly 53. The cylinder 34 could of course be connected to some other supporting structure in the base 26, i.e., not directly to the tube 24, if desired.

As another feature of the invention, the retaining sleeve 40 is releasably retained within the bore 42 of the tubular member 20 by coacting internal threads 54 formed on the member 20 and detents, or flutes, 56 formed on the outer surface of the sleeve 40. The detents 56 extend radially outwardly at a downward angle to the axis of the sleeve 40, and preferably are sufficiently resilient to permit enough radial deflection that the sleeve may be inserted in place without threading. This mechanism for retaining the retention sleeve 40 within the member 20 affords several significant advantages.

First, it allows the retention sleeve 40 to be installed in the member 20 with a one-step axial movement in which the detents 56 are simply snapped over the threads 54 in ratchet-like fashion. Two, should any clearance exist or subsequently develop between the end plate 44 and the land 52 on the tubular member 20, such clearance can be readily taken up by threading the sleeve 40 inwardly along the threads 54 in the bore 42. To that end, the sleeve 40 is preferably made somewhat longer than the axial extent of the bore 42, so that it is readily accessible outside the lower end of the tube 20 for threading into the bore 42. Three, there is no need for any special-purpose retention structure on the cylinder 34 of the pneumatic spring, with obvious attendant advantages in manufacturing costs and standardization of spring design. Four, unlike the prior art, use of the chair actually tends to further seat the retaining sleeve and pneumatic spring within the tube 20, thereby reinforcing the retaining action of the sleeve 40.

Although a single detent 56 is sufficient for retention of the sleeve 40 within the tube 20, it is preferable for equalization of load that a plurality of such detents be spaced around the circumference of the sleeve. As shown in FIG. 1, two or more axially-spaced rows of detents may be provided.

As another feature of the invention, the sleeve 40, spacers 49 and resilient stop member 50 are preferably preassembled on the pneumatic spring 30 and retained thereon by a spring clip 58 or other suitable device, so that the entire retaining sleeve-pneumatic spring unit may be inserted into and retained within the tubular member 20 in a one-step operation. This would of course be done at the time the support column 22 is being assembled and before the lower tubular member 24 is inserted over the upper tube 20. Should removal of the pneumatic spring 30 be required, e.g., because of spring failure or the like, this may readily be accomplished by gripping the protruding lower end of the retaining sleeve 40 and unthreading it from the tubular member 20. Here again, the retaining sleeve and pneumatic spring are withdrawn as a completely self-contained unit, with no external non-attached parts to bother with.

Although the threads 54 are shown in FIG. 1 as being formed on the tube 20, it will be understood that they could alternatively be formed on the sleeve 40, with the detents 56 then being provided on the tubular member 20. In that case, the detents would extend radially inwardly from the tube wall at an upward angle relative to the tube axis.

Figure 2:
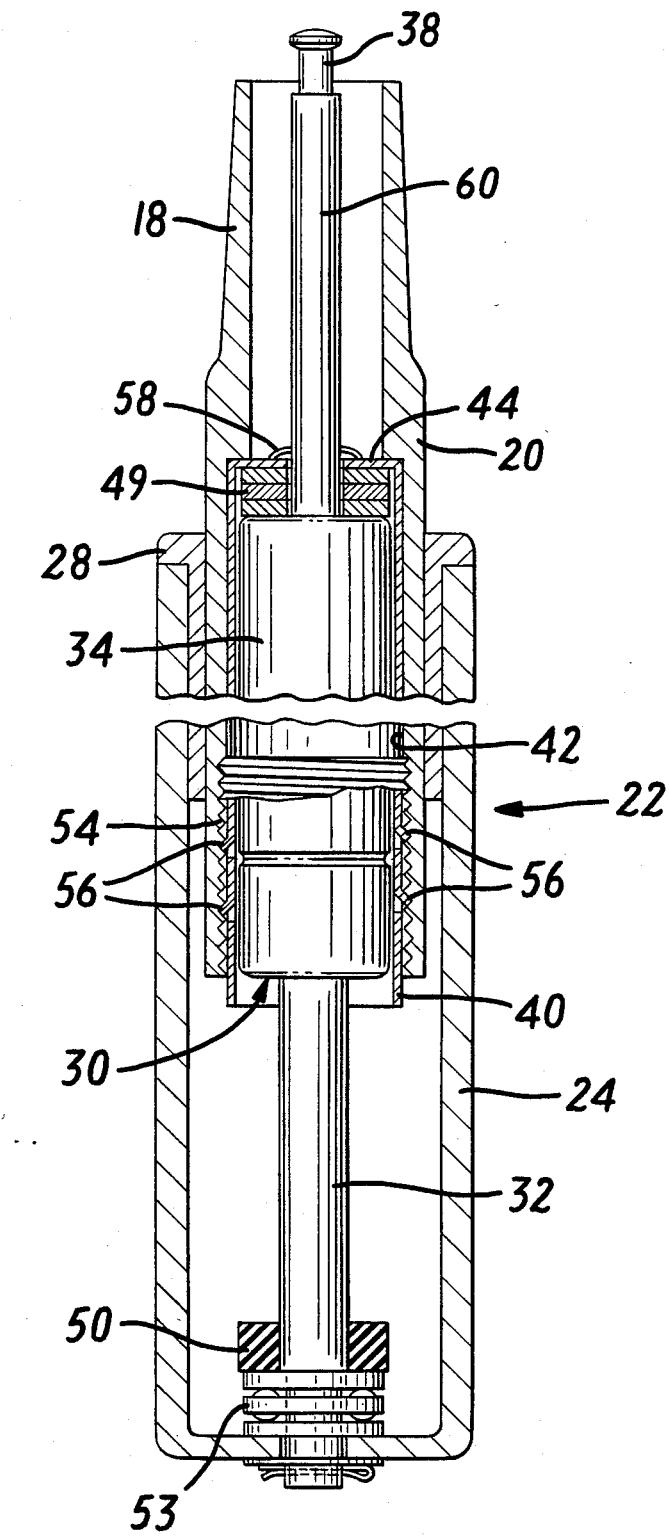
FIG. 2 is a partial sectional view, with parts broken away for clarity, of a support column embodying the invention, in which the pneumatic spring is arranged in the rod-down position.

The embodiment of the invention illustrated in FIG. 2 is essentially the same as that of FIG. 1 except that the pneumatic spring 30 is arranged in FIG. 2 in the rod-down position, whereas in FIG. 1 it is arranged in the rod-up position. Pneumatic springs suitable for use in the roddown orientation are illustrated in U.S. Pat. Nos. 3,790,119 and 4,245,826. In accordance with those disclosures, the cylinder 34 may be fitted at its upper end with an axially extending boss 60 through which is guided the valve actuating pin 38 for the internal gas control valve of the spring 30. As will be understood, if a resilient stop is provided, the resilient member 50 would be located at the lower end of the piston rod 32 so as to be interposed between the cylinder 34 and the lower end of the tubular member 24 in the event of spring failure or the like. Otherwise, the manner in which the pneumatic spring 30 is mounted within and removed from the upper tubular member 20 of the support column 22 may be identical in structure and function to that described in connection with FIG. 1. Accordingly, like elements are given like numbers in FIG. 2.

Although the invention has been described herein with reference to specific embodiments thereof, it will be understood that such embodiments are susceptible of variation and modification without departing from the inventive concepts disclosed. All such variations and modifications are therefore intended to be included within the spirit and scope of the appended claims.

I claim:

1. In a support column of adjustable length including a first tubular member connected to a surface to be supported, a second tubular member connected to a base for said surface, one of said tubular members being telescopically received within the other said tubular member, and a pressurized pneumatic spring located within said first and second tubular members, said spring including (1) a cylinder member operatively coupled to one of said first and second tubular members, (2) a piston rod member axially movable within said cylinder member and operatively coupled to the other of said first and second tubular members, and (3) means for permitting adjustment of the axial position of the piston rod member relative to the cylinder member and thereby of the length of said support column; the improvement comprising:

a retaining sleeve extending within the first tubular member in surrounding relation to said pneumatic spring, said retaining sleeve including means for operatively coupling one of said piston rod member and said cylinder member in load-transmitting relation to said first tubular member; and mutually-cooperative means carried solely by said retaining sleeve and said first tubular member for permitting insertion of said retaining sleeve and said pneumatic spring as a unit axially into said first tubular member and for releasably retaining said retaining sleeve within said first tubular member with said load-transmitting means operatively coupled to said first tubular member.

2. The support column of claim 1, wherein said retaining means comprises threads carried by one of said first tubular member and said retaining sleeve and at least one radially-projecting resilient detent member carried by the other of said first tubular member and said retaining sleeve, whereby said retaining sleeve may be inserted into said first tubular member by snapping said at least detent member over said threads and thereafter may be threadedly adjusted within or removed from said first tubular member.

3. The support column of claim 2, wherein said retaining sleeve when fully inserted into said first tubular member extends axially outward of the end of said first tubular member through which it was inserted, whereby said retaining sleeve is readily accessible to facilitate threading or unthreading of said sleeve within said first tubular member.

4. The support column of claim 2, wherein said threads comprises internal threads formed on said first tubular member, and said at least one detent member extends radially outward from the surface of said retaining sleeve.

5. The support column of claim 4, wherein said retaining means comprises a plurality of said detent members spaced circumferentially around the surface of said retaining sleeve.

6. The support column of claim 1, wherein said improvement further comprises means for retaining said retaining sleeve in place on said pneumatic spring, thereby to facilitate insertion of said retaining sleeve and said pneumatic spring as a unit into said first tubular member.

7. The support column of claim 1, wherein said load-transmitting means on said retaining sleeve comprises a radially inwardly extending member for engagement, on one axial side thereof, with a bearing surface on said one member of the pneumatic spring and, on the other axial side thereof, with a bearing surface on said first tubular member.

8. The support column of claim 7 wherein said radially inwardly extending member comprises a plate member located at the inner end of said retaining sleeve and extending radially inwardly over said pneumatic spring, a radially inner portion of said plate member engaging the bearing surface of said one pneumatic spring member and a radially outer portion of said plate member engaging the bearing surface on said first tubular member.

9. The support column of claim 8, wherein said improvement further comprises spacer means axially interposed between said plate member and said bearing surface on said one pneumatic spring member.

10. The support column of claim 8, wherein said improvement further comprises a resilient stop member axially interposed between said plate member and the axially inner end of said cylinder member.

11. A combined retaining sleeve-pneumatic spring unit for a support column including at least one tubular member adapted to receive said unit axially therewithin, comprising:

a retaining sleeve adapted to be inserted axially within said tubular member;

said retaining sleeve extending axially over and surrounding a portion of said pneumatic spring, said sleeve including means for operatively engaging in loadtransmitting relation said tubular member and one of the piston rod member and the cylinder member of said pneumatic spring;

retention means carried solely by said retaining sleeve for coacting with cooperative retention means carried solely by said tubular member so as to permit insertion of said retaining sleeve and said pneumatic spring as a unit axially into said tubular member and to releasably retain said sleeve within said tubular member; and means for retaining said retaining sleeve on said pneumatic spring.

12. The retaining sleeve-pneumatic spring unit of claim 11, wherein said retention means carried by said retaining sleeve comprises one of radially-projecting resilient detent means, for coaction with internal threads carried by said tubular member, and external threads, for coaction with radially-projecting detent means carried by said tubular members, whereby said retaining sleeve-pneumatic spring unit may be installed in said tubular member by snapping said detent means over said threads and thereafter may be threadedly adjusted within or removed from said tubular member.

13. The retaining sleeve-pneumatic spring unit of claim 11, wherein said detent means are carried by said retaining sleeve.

14. The retaining sleeve-pneumatic spring unit of claim 11, wherein said load-transmitting means on said retaining sleeve comprises a radially inwardly extending member for engagement, on one axial side thereof, with a bearing surface on said one penumatic spring member and, on the other axial side thereof, with a bearing surface carried by said tubular member.

15. The retaining sleeve-penumatic spring unit of claim 14, wherein said radially inwardly extending member comprises a plate member at the inner end of said retaining sleeve, a radially inner portion of said plate member engaging said bearing surface of said one pneumatic spring member and a radially outer portion thereof being adapted for engaging the bearing surface carried by said tubular member.

16. The retaining sleeve-pneumatic spring unit of claim 15 further comprising spacer means axially interposed between said plate member and said bearing surface on said one pneumatic spring member.

17. The retaining sleeve-pneumatic spring unit of claim 15, wherein said improvement further comprises a resilient stop member axially interposed between said plate member and the axially inner end of said cylinder member.

* * * * *